United States Patent [19]

Kimball

[11] Patent Number: 4,601,213

[45] Date of Patent: Jul. 22, 1986

[54] MECHANISM TO RECIPROCATE AND ROTATE A RAM

[76] Inventor: Charles R. Kimball, 250 S. Xenia St., Enon, Ohio 45323

[21] Appl. No.: 605,687

[22] Filed: Apr. 30, 1984

[51] Int. Cl.[4] .................... F16H 21/02; B65H 81/06
[52] U.S. Cl. ............................................. 74/23; 74/62;
242/1.1 R
[58] Field of Search .................. 74/23, 62; 242/1.1 R

[56] References Cited

U.S. PATENT DOCUMENTS

| | | |
|---|---|---|
| 1,198,114 | 9/1916 | Deaver . |
| 1,208,843 | 12/1916 | Schuyler ................... 74/23 |
| 1,264,260 | 4/1918 | Blair . |
| 1,857,871 | 5/1932 | Reaney . |
| 2,746,303 | 5/1956 | Pollock ..................... 74/62 |
| 3,032,893 | 5/1962 | Debeh . |
| 3,251,559 | 5/1966 | Moore . |
| 3,493,186 | 2/1970 | Arick . |
| 3,678,766 | 7/1972 | Geber ........................ 74/23 |
| 3,735,642 | 5/1973 | Hoppe ....................... 74/23 |
| 3,768,319 | 10/1973 | Lill . |
| 3,785,212 | 1/1974 | Eminger ................... 74/23 |
| 3,857,496 | 12/1974 | Gonzales . |
| 3,869,924 | 3/1975 | Beezer . |
| 4,158,314 | 6/1979 | Finegold . |
| 4,361,056 | 11/1982 | George . |

FOREIGN PATENT DOCUMENTS

| | | | |
|---|---|---|---|
| 447604 | 4/1949 | Italy ........................... 74/62 |
| 9824 | of 1843 | United Kingdom .................. 74/62 |
| 2108873 | 5/1983 | United Kingdom ............ 242/1.1 R |
| 790077 | 12/1980 | U.S.S.R. ......................... 242/1.1 R |

Primary Examiner—Lawrence J. Staab
Attorney, Agent, or Firm—Frost & Jacobs

[57] ABSTRACT

A device for rotating and reciprocating a ram by rotating the ram at the end of each reciprocation. The device includes a pair of supports for the reciprocating means and a pair of supports for the rotating means. Each pair of supports has a set of perpendicular grooves in which a sliding block reciprocates in each groove. The blocks are securely fastened to one another by means of a tie arm. Both the reciprocating means and the rotating means are synchronously driven with a timing belt.

12 Claims, 9 Drawing Figures

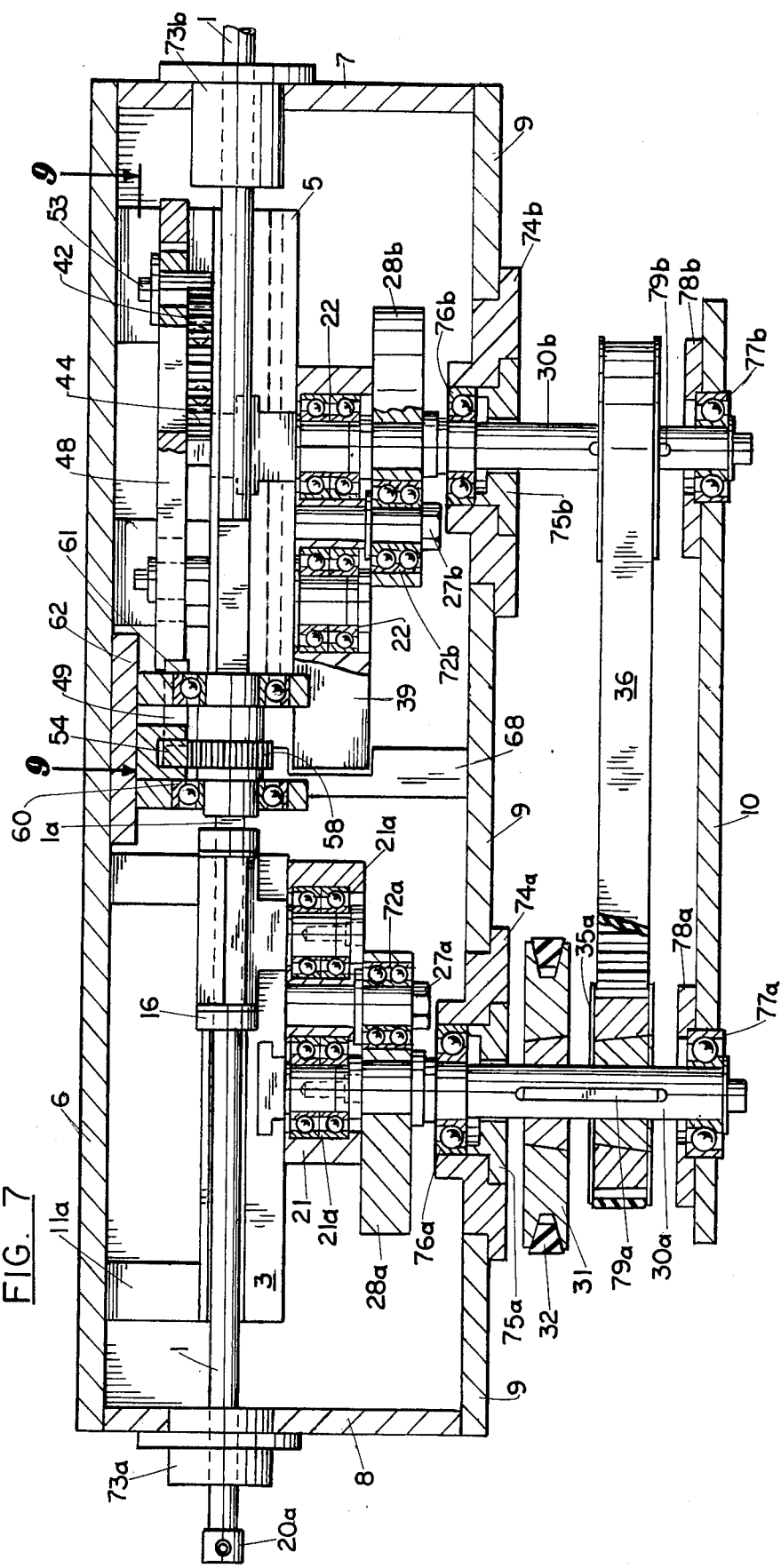

4,601,213

MECHANISM TO RECIPROCATE AND ROTATE A RAM

BACKGROUND OF THE INVENTION (1) Field of the Invention

The present invention pertains to a mechanism having an arm or ram which is capable of both reciprocating and rotating motion, with no rotation of the ram during the median pont of travel. In particular, the mechanism of the present invention is particularly useful to wind field stators, bobbins, alternators or armatures.

(2) Background of the Invention

Prior state of the art devices which reciprocate and rotate are heavy and bulky machines which require rigidity in their manufacture due to the balance problem incurred while driving a ram in a reciprocating motion. Furthermore, support facilities such as coolers and blowers, for dissipating heat build up, as well as the high power requirements (due to the required heavy-duty construction) make the cost of such machines prohibitive, while the maintenance of the machines becomes an ever increasing problem.

SUMMARY OF THE INVENTION

The present invention includes a reciprocating movement and a corresponding rotating movement, both of which are interrelated by a timing belt. Each movement is based upon converting a rotary motion to an oscillatory motion by means of a pair of sliding blocks. The pair of sliding blocks includes a vertical sliding block and a horizontal sliding block interconnected with a tie arm. Consequently, movement of either one of the sliding blocks results in movement of the other sliding block.

The rotary movement includes dwell time in which the greatest portion of the reciprocating movement is achieved.

In the broadest sense, the present invention includes a ram; apparatus to effect reciprocating movement of the ram; and apparatus to effect a rotary movement of the ram, without using a cam to control the rotation, wherein the apparatuses include a sliding vertical block and a sliding horizontal block interconnected with a tie arm, and both apparatuses are synchronously operated by means of a timing belt.

BRIEF DESCRIPTION OF THE DRAWINGS

FIG. 7 is a fragmentary cross sectional view taken along section line 7—7 of FIG. 2.

DESCRIPTION OF THE PREFERRED EMBODIMENTS

An understanding of the present invention can be had with reference to the drawings. The present invention comprises a reciprocating movement based on grooved slide supports 2, 3, and a rotating movement based on grooved slide supports 4 and 5. Supports 2 and 3 are positioned vertically above one another, while supports 4 and 5 are positioned side by side.

With respect to both the reciprocating movement and the rotating movement, a housing consisting of walls 6, 7 8 and 9 (FIG. 7) enclose the movements, and barrier wall 10 acts as an outboard support for the timing belt and power sheave described herein.

Figure 1:
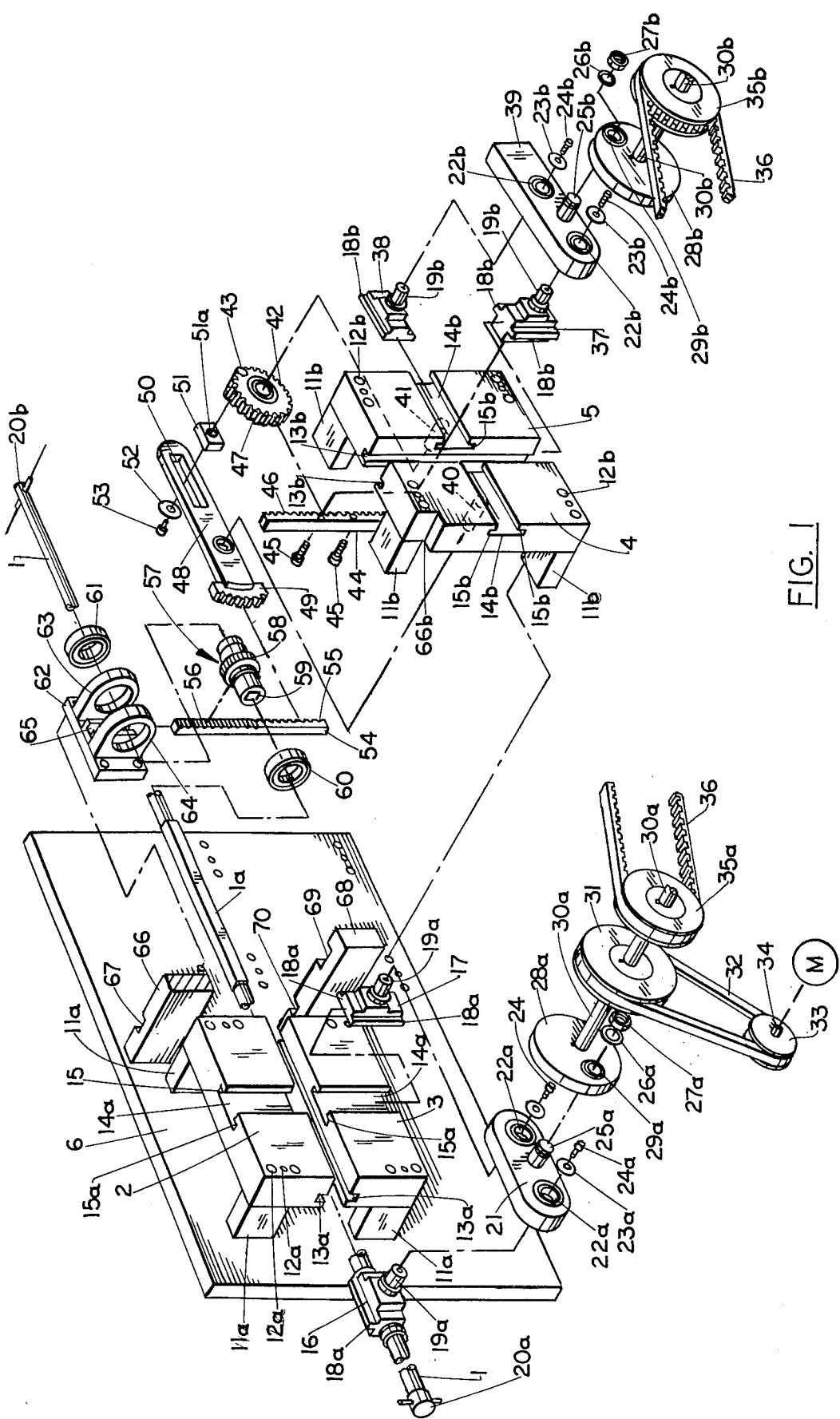
FIG. 1 is a fragmentary exploded perspective view of the present invention.

As illustrated in FIG. 1, the reciprocating movement includes supports 2 and 3 mounted on wall 6, with spacers 11a offsetting the supports from wall 6. The spacers and the supports are securely fastened together by means of screws, studs, dowels, or the like 12a. Each support 2, 3 contains a longitudinal groove 13a, wherein groove 13a on support 2 is on the bottom surface of the support, while groove 13a on support 3 is on the top surface of the support so that the longitudinal grooves 13a face one another. Additionally each support contains a transversely extending groove 14a, each side of which is undercut as illustrated by reference numeral 15a. For supports 2 and 3, groove 14a is vertically oriented.

A pair of sliding blocks 16, 17 slide in grooves 13a and 14a, respectively. In particular, each sliding block includes a pair of longitudinal ears 18a and a spur shaft 19a. Sliding block 16 is oriented so that its ears 18a are horizontal, while sliding block 17 is oriented so that its ears 18a are vertical. Both sliding blocks are oriented so that the spur shaft projects outwardly in the same direction, i.e. away from wall 6. The sliding blocks are integrally secured to one another by means of a movable tie arm 21.

Sliding block 16 is rigidly secured to a generally cylindrical ram 1 which is currently illustrated with an end cap 20a having one or more pins. End cap 20a serves no part of the present invention but is merely illustrated to show ram rotation. The particular device attached to the end of ram 1 depends upon the end use of the ram, e.g. to wind stators, bobbins, armatures, or the like.

Tie arm 21 includes a pair of spaced apart bearings 22a sized to rotatably fit spur shafts 19a. When the tie arm is positioned over sliding blocks 16,17 such that spur shafts 19a extend through bearings 22a, washers 23a, which have a diameter larger than the diameter of bearings 22a, are threadedly secured to spur shafts 19a with screws or the like 24a to prevent the tie arm from becoming disengaged from shaft 19a. Additionally, tie arm 21 includes a short generally cylindrical stud 25a protruding in the same direction as spur shafts 19a, and mounted midway between bearings 22a.

A horizontally extending drive shaft 30a has a drive crank 28a positioned at one end thereof, which includes a bearing 29a sized to rotatably receive stud 25a. When short stud 25a protrudes through bearing 29a, drive crank 28a is secured thereto by means of a washer 26a and a threaded nut 27a which mates with threads on the end of stud 25a.

Driven shaft 30a can be powered by any means. As illustrated, shaft 30a has mounted thereon sheave 31 which operatively rotates shaft 30a by means of a belt 32. Motor sheave 33 is securely fastened to shaft 34 of a motor, shown diagrammatically at M. Timing sheave 35a is integrally mounted on shaft 30a outwardly from sheave 31 and operatively drives timing belt 36 which powers the rotational movement of the present invention associated with supports 4 and 5.

The rotational movement of the present invention, also illustrated in FIG. 1, includes apparatus similar to that described for the reciprocating movement. Specifically, supports 4 and 5 are securely mounted to wall 6 by spacers 11b, which are similar to spacers 11a. Both spacers 11a and 11b set out supports 2, 3, 4 and 5 from wall 6 an equal distance. The supports and the spacers are attached to wall 6 by screws, studs, dowels, or the like 12b. Each support 4, 5 contains a longitudinal groove 13b, wherein grooves 13b on supports 4 and 5 are vertically positioned to face one another. Additionally each support contains groove 14b wherein each side of the groove is undercut as illustrated by reference numeral 15b. For supports 4 and 5, grooves 14b are aligned and horizontally oriented.

A pair of sliding blocks 37, 38 slide in grooves 13b and 14b, respectively. Each sliding block includes a pair of longitudinal ears 18b and a spur shaft 19b. Sliding block 37 is oriented so that its ears 18b are vertical, while sliding block 38 is oriented so that its ears are horizontal. Both sliding blocks are oriented so that the spur shafts 19b project outwardly in the same direction as spur shafts 19a. Sliding blocks 37 and 38 are movably secured to one another by means of tie arm 39, which is similar to tie arm 21, but is larger and heavier to counteract the weight of the ram and sliding block 16.

Tie arm 39 includes a pair of spaced apart bearings 22b sized to rotatably fit spur shafts 19b. When tie arm 39 is positioned over sliding blocks 37, 38 such that spur shafts 19b extend through bearings 22b, washers 23b, having a diameter larger than the diameter of bearings 22b are firmly secured to spur shafts 19b with screws 24b. This arrangement prevents tie arm 39 from sliding off spur shafts 19b during operation. Tie arm 39 also includes a short stud 25b protruding in the same direction as spur shafts 19b and mounted midway between bearings 22b.

A driven shaft 30b has a drive crank 28b positioned at one end of the shaft, and includes a bearing 29b sized to rotatably receive short stud 25b. When short stud 25b protrudes through bearing 29b, drive crank 28b is secured thereto be means of a washer 26b and a threaded nut 27b which mates with threads on the end of stud 25b.

Timing sheave 35b is integrally mounted on shaft 30b and is rotated by timing belt 36, which rotates driven shaft 30b. This arrangement assures that the reciprocating movement is synchronized with the rotating movement.

Supports 4 and 5 differ from supports 2 and 3 not only by their orientation, but also because supports 4 and 5 each have a peg shaft 40 and 41, respectively, shown in phantom in FIG. 1. Peg shaft 40 is longer than peg shaft 41 for reasons subsequently explained. A spur or pin gear 42 having a pin 43 integrally mounted on the circumference of the gear is rotatably mounted on peg shaft 41.

Sliding block 37 is rigidly fastened to a rack 44 with screws 45, or the like. Rack 44 and pin gear 42 are positioned adjacent one another so that teeth 46 of rack 44 mesh with teeth 47 of pin gear 42. Consequently, when sliding block 37 oscillates vertically, so does rack 44, which causes pin gear 42 to first rotate clockwise, then counterclockwise.

A pinion arm 48 is rotatably mounted on peg shaft 40 and includes a section of a pinion gear 49 securely connected to one end of arm 48, while the other end of arm 48 has an elongated longitudinally extending slot 50. A slide bar 51 is capable of longitudinally sliding within slot 50. Pin 43 of pin gear 42 is rotatably received within a hole 51a located in the center of slide block 51. Slide block 51 is held in place on pin 43 by any conventional method such as by a washer 52 and screw 53. Washer 52 has a diameter larger than the height of slot 50 which prevents the slide bar 51 from falling from the slot.

It will be observed that a peg shaft 40 is longer than peg shaft 41 because pinion arm 48 is set off from the back surface of support 4 by a distance equal to the width of pinion gear 42. This arrangement permits the gear to rotate freely and permits pivot arm 48 to rotate upwardly and downwardly as gear 42 oscillates clockwise, then counterclockwise.

Figure 9:
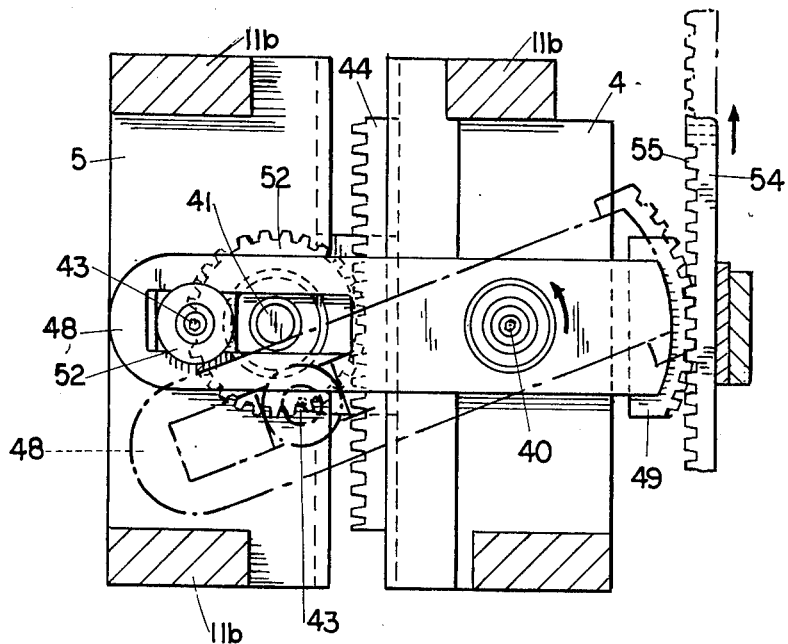
FIG. 9 is a fragmentary enlarged partially cross sectional rear elevational view of the rotational movement of the ram.

A channel rack 54 is provided having two sets of gear teeth 55 and 56 rotated 90° with respect to each other. Channel rack 54 reciprocates within a channel 65 provided in a yoke 62 which is firmly secured to wall 6. Gear teeth 55 mesh with pinion gear section 49, as illustrated in FIG. 9, so that as pinion arm 48 along with pinion gear 49 pivot upwardly and downwardly, channel rack 54 reciprocates upwardly and downwardly within channel 65.

Figure 8:
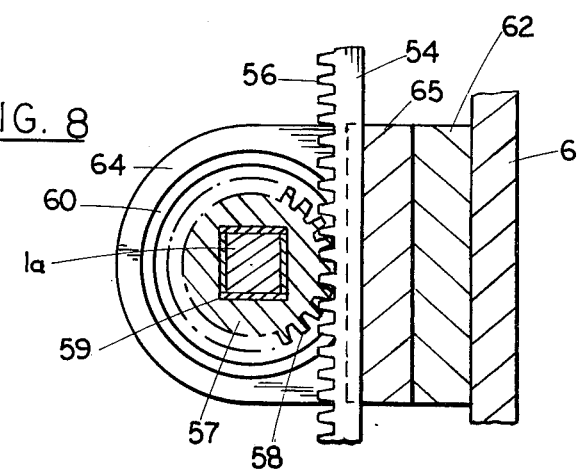
FIG. 8 is an enlarged fragmentary partially cross sectional side view of the rack and pinion arrangement for rotating the ram.

Yoke 62 includes, in addition to channel 65, a pair of bearing loops 63 and 64, positioned on each side of the channel. The loops retain bearings 60 and 61, which retain a sleeve 57, such as a type P-75 "sturdy sleeve". Sleeve 57 includes a circular gear collar 58 positioned midway between the ends of sleeve 57. The ends of sleeve 57 are carried by bearings 60 and 61. Sleeve 57 includes a longitudinal square shaped drive opening which snugly but slidingly fits the square shaped central portion 1a of ram 1. Such an arrangement permits sleeve 57 to rotate ram 1 as is illustrated in FIG. 8, but also allows ram 1 to reciprocate horizontally.

A brace 66 aids in anchoring support 4 by being secured to both wall 6 and support 4 at cut corner 66b. Brace 68 helps rigidify walls 6 and 9 by being secured to both walls as shown in FIG. 7. Brace 66 includes notch 67, and brace 68 includes notch 70 through which channel rack 54 reciprocates without interferring with either brace. Brace 68 additionally includes a large notch 69, which permits tie arm 39 to completely rotate without coming into contact with brace 68 as shown in FIG. 7.

As illustrated in FIG. 7, tie arms 21 and 39 each have a pair of matching bearings 22a and 22b, respectively to permit the tie arms to pivot around each stud shaft 19a and 19b.

The housing in end walls 7 and 8 contain oilite type bearings 73a and 73b which allows ram 1 to freely reciprocate and rotate as it protrudes beyond walls 7 and 8. Side housing wall 9 contains bearing plates 74a and 74b. Each bearing plate containing bearings 76a and 76b, respectively, to rotatably support shafts 30a and 30b. The bearings 76a and 76b are protected by bearing covers 75a and 75b. Outboard support 10 also supports bearings 77a and 77b including bearing plates 78a and 78b for allowing easy rotation of shafts 30a and 30b.

Sheaves 31, 35a and 35b along with drive cranks 28a and 28b may be non-rotatably mounted to shafts 30a and 30b in any known manner such as, for example, by a key 79a and 79b as illustrated in FIG. 7. In particular, a key may only lock in one sheave as illustrated by key 79b, or a pair of sheaves as illustrated by key 79a. Optionally, belts 32 and 36 can be replaced by chains, direct drive gear mechanisms, or the like.

In operation of the present invention, both the rotary movement and the reciprocating movement act upon the ram. Generally each movement acts on the ram at different times so that the rotary motion takes place just at the ends of the forward and reverse stroke (for example in the last 1½" of travel), and not in the median portion of the stroke. In other words, there is little simultaneous reciprocating and rotary motion. In order to permit a complete understanding of the invention, only the reciprocating movement will be described intially. However, the rotary movement is similar, insofar as the operation of the sliding blocks is concerned.

In viewing FIG. 1, the ram is connected to the horizontal sliding block 16 in an extended position, while the vertical sliding block 17 serves only as a stabilizing. As the drive crank 28a rotates counterclockwise as viewed in FIG. 1, the tie arm 21 is forced to first drive the verticl sliding block 17 upwardly, while simultaneously driving the horizontal sliding block to the right toward the center of the device. When the drive crank reaches the top of its radius (when bearing 29a is positioned at the top 12 o'clock position), the horizontal block 16 is driven away from the junction of grooves 13a and 14a, continuing toward the right, while the vertical sliding block 17 begins a downward descent. When the driving crank reaches the 3 o'clock position, the horizontal sliding block has reached its outer right boundary or retracted position, and the vertical block is half way through its descent, positioned at the junction of grooves 13a and 14a. As the drive crank continues to rotate until the bearing reaches the 6 o'clock position, the vertical sliding block has reached its lowest position and the horizontal sliding block has begun to return to its left boundary such that ram 1 begins to protrude outwardly about half its maximum distance. This places the horizontal sliding block at the junction of the grooves. When the driving crank is at the 9 o'clock position, the vertical sliding block has begun to ascend and is at the junction of the grooves, while the ram and horizontal sliding block have reached the left-hand boundary or extended position, which is the maximum extention for the ram.

In summary, when bearing 29a is at the 12 o'clock position the ram has retracted inwardly half its maximum travel distance. When bearing 29a is at the 3 o'clock position, the ram has fully retracted inwardly. When the bearing is in the 6 o'clock position, the ram has extended half its maximum extension. When the bearing is in the 9 o'clock position, the ram is fully extended.

The operation of the rotational movement, particularly including supports 4 and 5, and sliding blocks 37 and 38, is similar to the reciprocating movement except that the horizontal sliding block 38 is the stabilizing force, while the vertical sliding block 37 is the "working" block.

Figure 2:
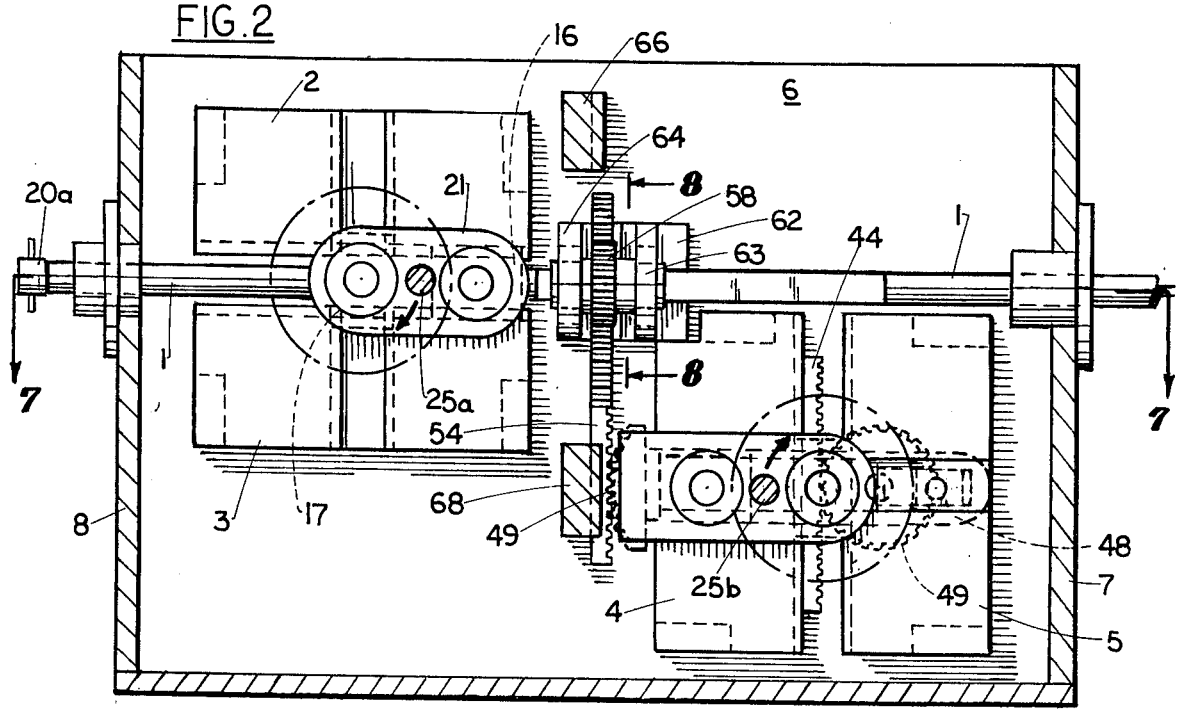
FIG. 2 is a fragmentary cross sectional, enlarged elevational view of the present invention illustrating the reciprocating and rotating movements, wherein the ram is in the retracted position, and partially rotated 90°.

The compound motion of the present invention is shown at five different positions in FIGS. 2-5. In FIG. 2, ram 20a is fully retracted, but only rotated 90°. Sliding blocks 16 and 17 are both in the plane of horizontal groove 13a, resulting in short stud 25a being positioned at the 3 o'clock position. Sliding blocks 37 and 38 are also both in the plane of horizontal groove 13b, with short stud 25b being in the 9 o'clock position. Consequently, not only is the reciprocating and rotating movements balanced within themselves due to stabilizing sliding blocks 17 and 38, but each movement is balanced with respect to each other, i.e., when the reciprocating movement is in the retracted position (3 o'clock), the rotational movement, when partially rotated approximately 90°, is in the frontmost position (9 o'clock). At partial rotation, pinion gear 49 contacts the mid length point of rack 44.

Figure 3:
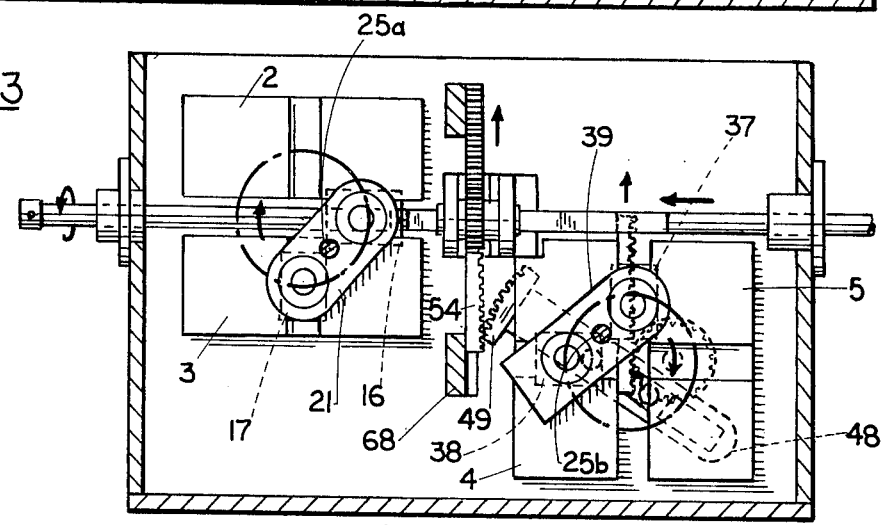
FIG. 3 is a fragmentary cross sectional elevational view similar to that shown in FIG. 2, wherein the ram has been fully rotated 180° and is in the initial stages of extended movement.

FIG. 3 illustrates the ram being slightly extended and fully rotated. In this position sliding blocks 16 and 17 are spaced an equal distance from the junction of grooves 13a and 14a. On the other hand, sliding blocks 37 and 38 are also positioned an equal distance away from the junction of grooves 13b and 14b, but are diagonally opposite in position, i.e., short shaft 25a is diagonally opposite short shaft 25b. When the ram is fully rotated as illustrated herein, pinion gear 49 and rack 54 contact one another at their lowermost ends. In order to achieve this position, the rotation of arm 48 causes both the integral pinion gear 49 and rack 54 to be elevated to their highest position.

Figure 4:
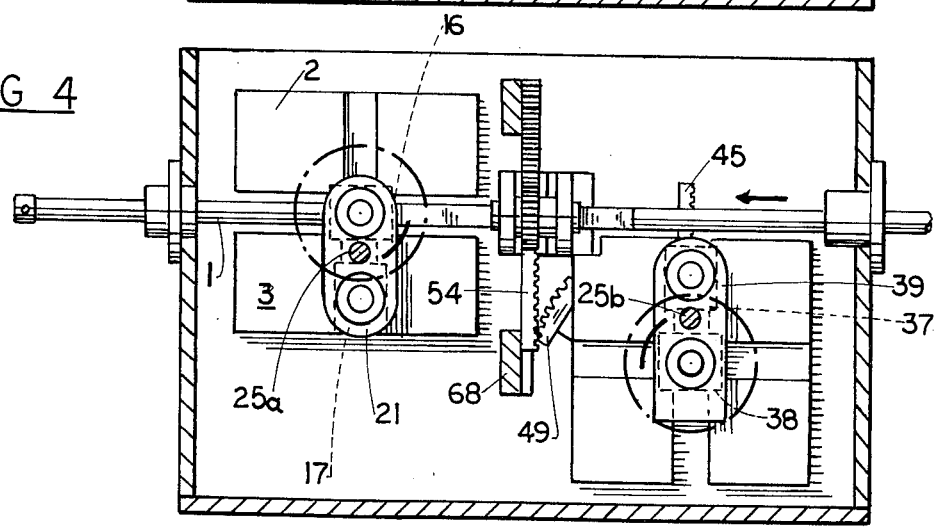
FIG. 4 is a fragmentary cross sectional elevational view similar to that shown in FIG. 3, illustrating a partially extended ram, fully rotated 180°.

FIG. 4 illustrates the position of the internal elements for a halfway extended but fully rotated ram. In order to maintain the fully rotated position during the extension or retraction period of the ram, the rotational movement has dwell time "built-into" its movement. The dwell time is built-into the rotational movement because slot 50 (see FIG. 1) in arm 48 is of a length such that when the sliding movement of slide bar 51 connected to pin gear 42 is rotated to the end of its rotation. Pin 43 passes through a point perpendicular to arm 48 pivoted in an up position. While pin 43 passes through this position, no movement of arm 48 takes place until pin 43 moves sliding bar 51 away from this point. This action takes place while the ram 1 is moving through mid-stroke.

It must be noted that the speed of the ram and the rotating members are different at different points in the stroke. That is, ram speed is faster during mid-stroke and slower at the ends of the stroke or rotating position, while the rotating members speed is faster during oscillation and slower during dwell time. This acounts for the non-rotation of the ram 1 during mid-stroke. Thus, the time required for slide bar 51 to travel from the edge of a central portion point perpendicular to arm 48 to the end of the slot and back to the edge, permits the ram to be oscillated while traveling at a slower speed at the ends of the stroke. During travel of the slide bar 51 through the central portion of the slot the ram is rotated. Simultaneously, the reciprocating ram is deaccelerating to the end of its stroke, at which point it starts accelerating in the opposite direction. Slide bar 51 again reaches the dwell period of the slot 50 and again the ram is in a mid-stroke position as previously explained, while no rotation occurs.

Figure 5:
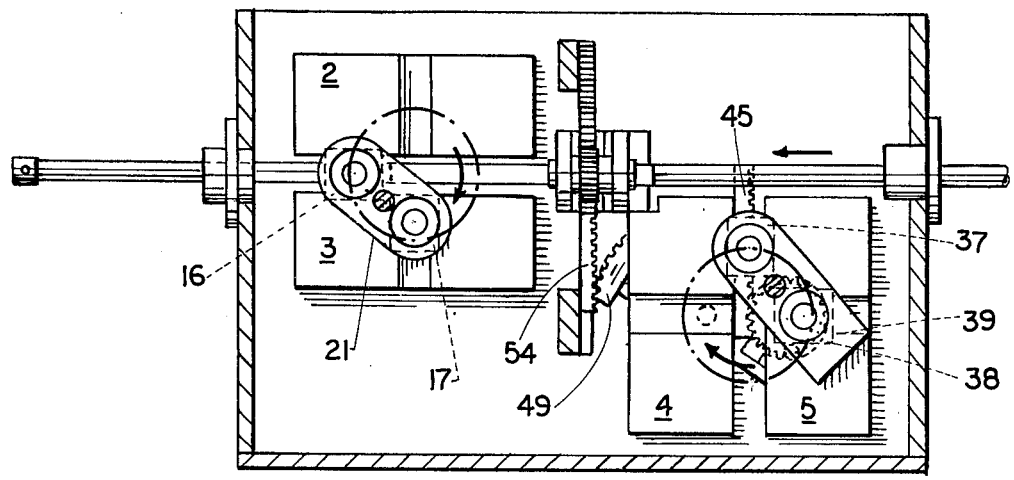
FIG. 5 is a fragmentary cross sectional elevational view similar to that shown in FIG. 4, illustrating a partially extended ram, fully rotated 180°.
Figure 6:
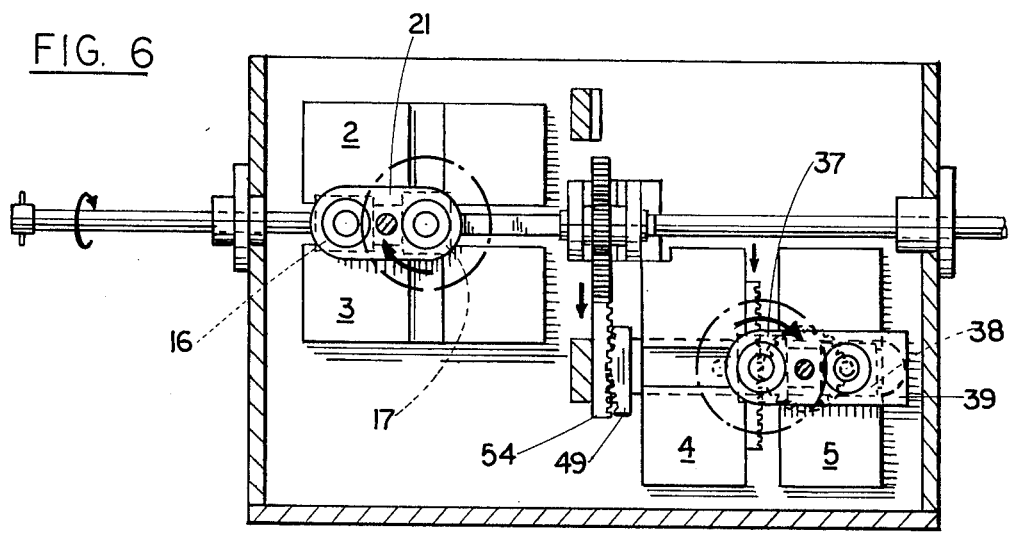
FIG. 6 is a fragmentary cross sectional elevational view similar to that shown in FIG. 5 except the ram is partially rotated 90°.

Viewing FIGS. 3-6 illustrates the above operation. As stated previously, FIG. 3 shows the ram being fully rotated (note the position of gear 49) but only slightly extended. FIG. 4 shows the ram maintaining its full rotation (note the position of gear 49) but is now half way extended. FIG. 5 shows the ram substantially extended, but not quite fully extended, and again the ram is maintaining the fully rotated position. FIG. 6 shows the ram being fully extended wherein the sliding blocks 16 and 17 are horizontally aligned with the ram, and the ram is partially (half way) rotated through 90° (gear 49 and arm 48 are now in a horizontal position).

From the position illustrated in FIG. 6, the ram starts to slightly retract, while the completion of rotation occurs. Again, the rotation is maintained until the ram is substantially retracted. At this point the rotational operation is repeated, as shown in FIG. 9. Note that the edge of the central position of slot 50 where all the movement occurs causing rotation is slightly before the solid line position of pin 43 (slightly to the left of the pin). The other edge of the central position is about where pin 43 is shown in phantom. Note that in either case there is space between the edge of the central portion and the end of the slot.

Various modifications may be made in the present invention without destroying the concept. For example, if more reciprocating movement (greater distance) is desired, a larger drive crank 28a and tie arm 21 may be employed. If more or less rotation is desired, the location of drive pin 43 is moved closer to the pivot point of pin gear 42 thus giving more or less movement to pinion arm 48, and more or less rotation to pinion gear 58.

When pin gear 42 is rotated clockwise, end 20a of ram 10 is also rotated clockwise as viewed in the direction of FIG. 1. When pin gear 42 is rotated counterclockwise ram 10 is also rotated counterclockwise. Thus, pin gear 42 and ram rotation are directly related. Therefore, if the ram is only rotated 180°, gear 42 is likely to only employ a portion of its circumference. Consequently, it may not be necessary to manufacture pin gear 42 with a complete circumference of teeth.

It will be understood that changes may be made to the embodiment described within the scope and principle of the present invention as expressed in the appended claims.

What is claimed is:

1. Apparatus for causing oscillating movement of a ram including a reciprocating stroke and rotational movement of the ram near the ends of ram stroke comprising:
   (a) an elongated ram;
   (b) first and second support blocks each containing a pair of perpendicular arranged ways;
   (c) a sliding block mounted for reciprocating sliding movement in each of said ways;
   (d) an elongated tie arm pivotally connecting the sliding blocks of each support block;
   (e) means for synchronously driving said tie arms so as to cause timed reciprocating motion of said sliding blocks, each of said tie arms including spaced means pivotally connecting said tie arm to each of the associated sliding blocks and pivot means positioned between said pivotally connecting means;
   (f) a drive crank associated with each of said tie arms and having eccentrically mounted means rotatably mounted to said pivot means;
   (g) means for synchronously rotating said drive cranks;
   (h) first connecting means associated with one of the sliding blocks of said first support block for causing reciprocating movement of the ram; and
   (i) second connecting means associated with one of the sliding blocks of said second support block for causing rotational motion of said ram near the ends of ram reciprocating travel, said second connecting means further comprising
      (i) and elongated toothed rack fixedly secured to said one sliding block,
      (ii) a rotatably mounted spur gear meshingly engaging said rack,
      (iii) an elongated pivotally mounted pinion arm drivingly connected to said spur gear at one end and terminating at its opposite end in pinion gear means,
      (iv) rack gear means mounted for reciprocating motion and meshingly engaging said pinion gear means, and
      (v) sleeve gear means slidingly and rotatably connected to said ram and meshingly engaging said rack gear means,
   whereby reciprocating motion of said one sliding block causes rotational movement of said ram over a portion at least of its reciprocating travel.

2. The apparatus according to claim 1 wherein said synchronous rotating means comprises motor means for rotating a first one of said drive cranks and means for driving the other of said drive cranks from said first drive crank.

3. The apparatus according to claim 2 wherein said driving means comprises flexible drive belt means.

4. The apparatus according to claim 1 wherein said first connecting means comprises means drivingly connecting said one sliding block to the ram such that reciprocating movement of the sliding block causes corresponding reciprocating movement of the ram while permitting rotational movement thereof.

5. The apparatus according to claim 1 wherein said second connecting means includes means for adjusting the amount of rotation of the ram.

6. The apparatus according to claim 5 wherein said adjusting means comprises adjusting means drivingly connecting said spur gear to said pinion arm.

7. The apparatus according to claim 6 wherein said spur gear includes a pin fixedly mounted thereto and said pinion arm includes a longitudinally extending slot in which a sliding block is captured which slidingly receives said pin for driving the sliding block in an oscillating motion from said spur gear.

8. The apparatus according to claim 7 including adjustment means for adjusting the amount of rotation of the ram comprising means for adjusting the amount of sliding movement of the sliding block drivingly connected to the spur gear pin within the pinion arm slot.

9. The apparatus according to claim 7 wherein said pin is located so as to produce a predetermined dwell at the end of ram travel.

10. The apparatus according to claim 1 wherein the other of each sliding block pair includes means weighted to counterbalance the weight of apparatus connected to the first of said pair of sliding blocks.

11. The apparatus according to claim 1 including means associated with said second connecting means for producing a predetermined dwell at the center of ram travel.

12. The apparatus according to claim 1 wherein said first and second connecting means are arranged so that said ram reciprocates within one of said ways free of interference with said sliding blocks.

* * * * *